(12) United States Patent
Bergl et al.

(10) Patent No.: US 6,246,751 B1
(45) Date of Patent: *Jun. 12, 2001

(54) APPARATUS AND METHODS FOR USER IDENTIFICATION TO DENY ACCESS OR SERVICE TO UNAUTHORIZED USERS

(75) Inventors: Vladimir Bergl, Prague (CZ); Kenneth Davies, Ossining, NY (US); Abraham Poovakunnel Ittycheriah; Stephane Herman Maes, both of Danbury, CT (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,121

(22) Filed: Aug. 11, 1997

(51) Int. Cl.[7] ............................. H04M 1/64; H04M 11/00; H04M 17/00; G06K 9/00; G10L 7/08
(52) U.S. Cl. ................. 379/67.1; 379/88.01; 379/91.01; 379/144; 379/145; 379/189; 704/270; 704/273; 382/115; 382/116
(58) Field of Search ............................. 379/67.1, 80, 83, 379/88.01, 88.02, 88.03, 88.04, 88.08, 88.22, 189, 194, 201, 211, 212, 200, 91.01, 91.02, 93.12, 144, 145; 704/234, 251, 260; 707/100, 104; 382/115, 116, 118, 124; 455/410, 515, 53.1, 54.1

(56) References Cited

U.S. PATENT DOCUMENTS

| | | | |
|---|---|---|---|
| 3,967,076 | * | 6/1976 | Balzer ................................... 379/161 |
| 3,980,836 | * | 9/1976 | Chan et al. ........................... 379/200 |
| 4,063,036 | * | 12/1977 | Hunsicker ............................. 379/36 |
| 4,757,525 | * | 7/1988 | Matthews et al. ...................... 379/89 |
| 5,249,230 | | 9/1993 | Mihm, Jr. ............................... 380/23 |

FOREIGN PATENT DOCUMENTS

| | | |
|---|---|---|
| 581689A1 | 2/1994 | (EP) . |
| 750413A2 | 12/1996 | (EP) . |
| 750413A3 | 12/1996 | (EP) . |
| 63-151197 | 6/1988 | (JP) . |
| 9518441 | 7/1995 | (WO) . |

OTHER PUBLICATIONS

ICSA 1998 Glossary of Biometric Terms.
Biometrics Technology.
Digital Processing of Signals, Rabiner et al. 1978.
Clark, D.W., "Where You Go, So Go The Calls", AT&T Technology, US. American Telephone & Telegraph Co., Short Hills, NJ. vol. 8, No. 3, Sep. 21, 1993.

* cited by examiner

Primary Examiner—Fan Tsang
Assistant Examiner—Allan Hoosain
(74) Attorney, Agent, or Firm—F. Chau & Associates, LLP

(57) ABSTRACT

Apparatus for preventing unauthorized use of a voice dialing system and, particularly, a call forwarding feature associated with the system whereby system users may forward a telephone number respectively associated therewith to a remote location in order to receive phone calls at the remote location, comprises: a database for pre-storing telephone numbers of system users and for pre-storing acoustic models respectively representative of speech associated with each system user, the acoustic models respectively corresponding to the telephone numbers; and a speaker identification module operatively coupled to the database for obtaining and decoding a speech sample from a potential system user during the potential users' attempt to make a telephone call, the speaker identification module comparing the decoded speech sample obtained with the pre-stored acoustic model associated with the telephone number dialed by the potential user; whereby if the decoded speech sample substantially matches the pre-stored acoustic model, then the phone call attempted by the potential user is terminated.

13 Claims, 2 Drawing Sheets

U.S. PATENT DOCUMENTS

| | | | |
|---|---|---|---|
| 5,327,486 | * | 7/1994 | Wolff et al. ............................. 379/96 |
| 5,414,755 | * | 5/1995 | Bahler et al. ....................... 379/67.1 |
| 5,452,340 | * | 9/1995 | Engelbeck et al. ................. 379/67.1 |
| 5,465,290 | * | 11/1995 | Hampton et al. ................... 379/67.1 |
| 5,583,920 | * | 12/1996 | Wheeler, Jr. ........................... 379/88 |
| 5,742,905 | * | 4/1998 | Pepe et al. ........................... 455/461 |
| 5,917,913 | * | 6/1999 | Wang ..................................... 380/25 |
| 5,926,533 | * | 7/1999 | Gainsboro ........................... 379/188 |
| 5,930,804 | * | 7/1999 | Yu et al. .............................. 707/104 |
| 5,999,611 | * | 12/1999 | Tatchell et al. ..................... 379/211 |
| 6,038,334 | * | 3/2000 | Hamid ................................. 382/124 |

APPARATUS AND METHODS FOR USER IDENTIFICATION TO DENY ACCESS OR SERVICE TO UNAUTHORIZED USERS

BACKGROUND OF THE INVENTION

The present invention relates to apparatus and methods for user identification to deny access or service to unauthorized users and, more particularly, to apparatus and methods for speaker identification to deny access of a user to a voice dialing system for unauthorized purposes such as abusing a call forwarding service.

It is known that some voice dialing systems have a call forwarding or "follow-me" feature. Such a feature permits a person (user) having a telephone number (extension) within the voice dialing system, e.g., an employee, to forward his telephone calls, made to that number by a caller, to a remote location where he is present. In this way, a caller may reach that person seamlessly whether that person is at the original location of the number or at the remote location to which the number has been forwarded.

However, it is also known that such a call forwarding feature may be abused by an unscrupulous system user. For instance, such a person may desire to talk with another party whose telephone is external to the voice dialing system, e.g., a phone connected to a public switching telephone network (PSTN). By the user forwarding his number to the desired partys' phone using the follow-me feature of the voice dialing system, the user may then dial his own telephone number from any location which will result in his reaching the desired party at the phone where the users' number was forwarded. In this way, the user fraudulently causes the system to treat the call as if it were an system-internal call rather than an outside call to an outside party and thus cause the system to incur the total cost of the call. Also, the actual destination of the phone call (i.e., the remote location) may be masked from the system since the telephone number dialed to reach that destination is the internal number of the system user.

SUMMARY OF THE INVENTION

It is an object of the present invention to provide apparatus and methods for biometric identification and/or non-biometric identification in order to deny access to a class of users where the class may be singular to a particular service or feature of a system.

It is another object of the present invention to provide apparatus and methods for performing biometric identification and/or non-biometric identification in order to prevent a person from fraudulently using a company voice dialing system to make personal calls at the company's expense.

In one broad aspect of the present invention, apparatus for identifying service users in order to prevent unauthorized use of a plurality of services by service users comprises: means for pre-storing one of a biometric attribute and a non-biometric attribute of at least a representative portion of the service users, the pre-storing means partitioning the pre-stored attributes into groups according to a predetermined service participation schedule with respect to the plurality of services; means for obtaining one of the biometric attribute and the non-biometric attribute from a potential user during the potential users' attempt to access the service; and means for comparing one of the obtained biometric attribute and the obtained non-biometric attribute with one of the pre-stored biometric attributes and the pre-stored non-biometric attributes within the groups; whereby if one of the obtained biometric attribute and the obtained non-biometric attribute substantially matches one of a pre-stored biometric attribute and a pre-stored non-biometric attribute within one of the groups, then the apparatus denies the potential user access to the particular service associated with the group containing the match. As will be explained in greater detail, the biometric attribute may be voice, fingerprint, etc. and the non-biometric attribute may be a PIN (personal identification number), password, etc. The invention provides that one or more biometric attributes or one or more non-biometric attributes may be employed to provide the benefits of the invention, however, any combination of biometric and non-biometric attributes may also be employed.

In another aspect of the present invention, apparatus for preventing unauthorized use of a voice dialing system and, particularly, a call forwarding feature associated with the system whereby system users may forward a telephone number respectively associated therewith to a remote location in order to receive phone calls at the remote location, comprises: a database for pre-storing telephone numbers of system users and for pre-storing acoustic models respectively representative of speech associated with each system user, the acoustic models respectively corresponding to the telephone numbers; and a speaker identification module operatively coupled to the database for obtaining and decoding a speech sample from a potential system user during the potential users' attempt to make a telephone call, the speaker identification module comparing the decoded speech sample obtained with the pre-stored acoustic model associated with the telephone number dialed by the potential user; whereby if the decoded speech sample substantially matches the pre-stored acoustic model, then the phone call attempted by the potential user is terminated.

Advantageously, in this manner, the present invention provides for identifying a requester of the services as a user on a list of unauthorized users (i.e., a black list). Thus, the users on the black list are denied access to the service, or provided with a phone number to call instead of being connected, or transferred to an operator, while any other user, not on the list, is permitted access. Accordingly, instead of having to identify and/or verify the actual identity of the requester, the present invention uniquely need only provide for identifying the requester as a person on the unauthorized users list.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
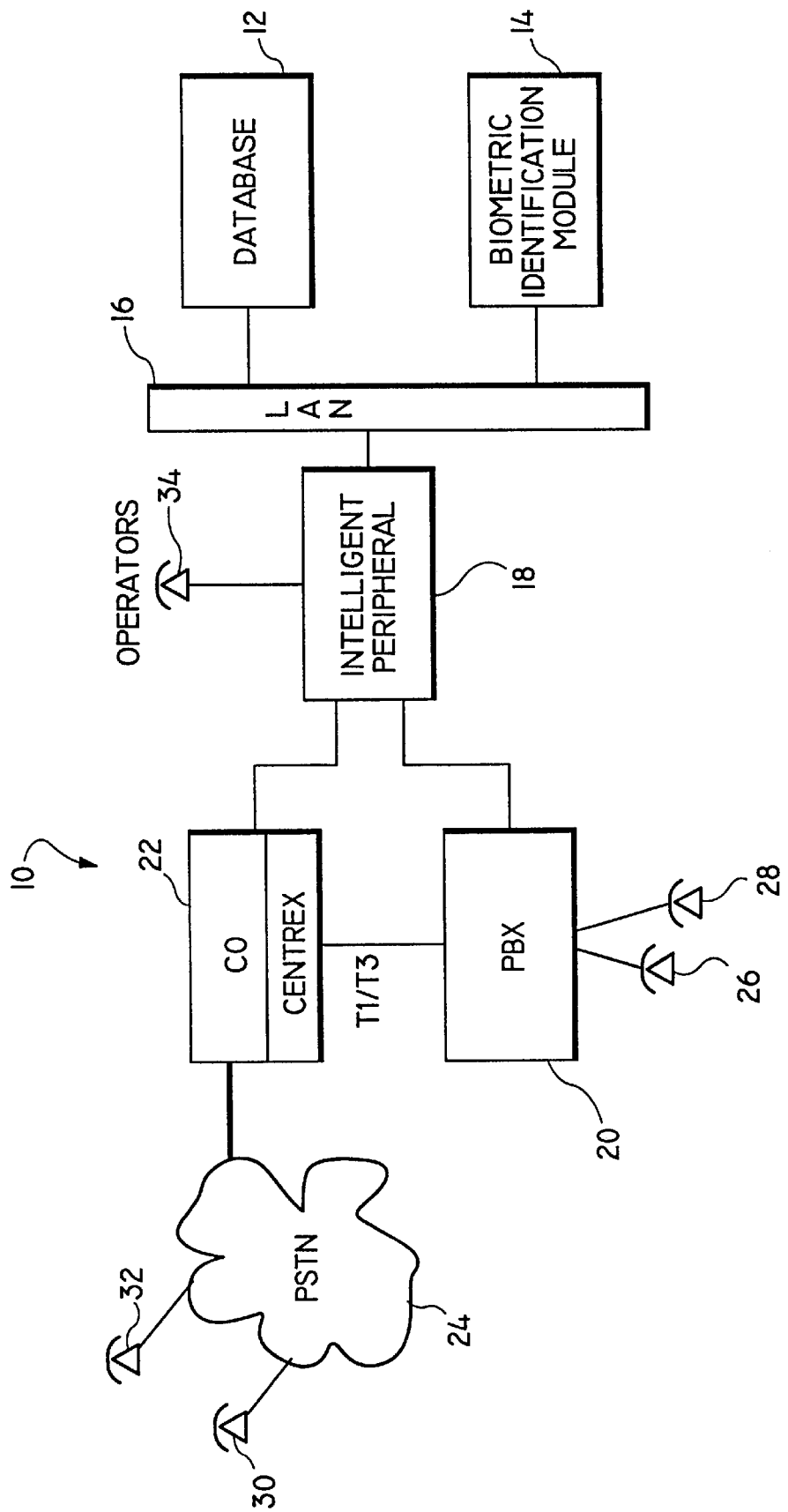
FIG. 1 is a block diagram of a voice dialing system according to the present invention.

Referring to FIG. 1, a voice dialing system 10 according to the present invention is shown. In such a preferred architecture, a database 12 and a biometric identification module 14 are operatively coupled to a network 16. An intelligent peripheral 18 is operatively coupled to the network 16 and to a private branch exchange (PBX) 20 and to a centrex CO 22 of a telephone provider which, itself, is operatively coupled to a public switching telephone network (PSTN) 24. The PBX 20 is also operatively coupled to the centrex CO 22. It is to be appreciated that the voice dialing system 10 is preferably implemented in a corporate setting whereby the PBX 20 is a private telecommunications exchange on the corporation's premises which provides a switching facility for telephones on extension lines within the premises (internal phones) and access to the public telephone network (external or outside phones), i.e., PSTN 24. Thus, telephones 26 and 28 are internal corporate phones of, for instance, employees, which are operatively coupled to the PBX 20. Such phones are said to be "behind" the PBX 20. On the other hand, telephones 30 and 32 are telephones outside of the corporate premises, for instance, residences or other businesses. It is to be understood that only a few telephones (internal phones 26 and 28 and external phones 30 and 32) are shown in FIG. 1 for the sake of simplicity; however, the system of the invention is not so limited. Also, telephone 34, operatively coupled to the intelligent peripheral 18, represents operator service in the voice dialing system, as will be explained.

Normal telephone operation flow through the system 10 will now be described. For incoming calls, for instance, from telephone 32 to telephone 28, a call is passed through PSTN 24, to the centrex CO 22, to the PBX 20, to telephone 28. For outgoing calls, for instance, from telephone 28 to telephone 32, a caller utilizes the voice dialing features of the system. For example, a caller will state a name and the system will dial the phone number of the person associated with that name. Specifically, the request goes through the PBX 20, to the intelligent peripheral 18, through the network 16, and in accordance with the identification module 14 and database 12 as will be explained, the decision to connect the call back through the network and intelligent peripheral to the centrex CO 22 and the PSTN 24 to the outside telephone 32 is made. Internal (extension to extension calls) between telephones 26 and 28 are accomplished internally through the PBX 20.

However, it is to be appreciated that a voice dialing system may permit a user to access the system from external telephones 30 and 32, by stating the name of party to be reached, as explained above. When using an external phone, access may be facilitated by a toll-free service which further aggravates the problem of users abusing a call forwarding feature, as will be explained below.

The voice dialing system 10 of the invention provides a call forwarding service or follow-me feature which is extremely useful to employees who are constantly mobile, that is, who travel and work away from the corporate premises during the course of the day. With this feature, the employee may effectively transfer the telephone number associated with his internal corporate phone to an external phone at the location where he is working that day. Thus, when an outside caller or an internal caller attempts to reach the employee at his regular phone number, the call is forwarded to the telephone at the remote location where he is working. However, as previously mentioned, conventional voice dialing systems which provide a similar call forwarding feature as just described are susceptible to abuse. Such conventional systems permit a dishonest employee to forward his telephone number to an outside party with whom he desires to communicate. Once his phone number is transferred to the outside partys' phone, the employee may dial his own number from another internal phone or an external phone and the call will be forwarded to the party he wishes to contact. In this way, the employee fraudulently causes the corporate voice dialing system to treat the call as if it were a system-internal call rather than an outside call to an outside party and thus cause the system to incur the total cost of his personal call. Also, the actual destination of the phone call (i.e., the remote location of the outside party) is masked from the system since the telephone number dialed to reach that destination is the internal number of the employee.

Voice dialing systems may come in many forms. Traditional voice dialing includes enrollment of 10–50 (or any number) of names and phone numbers and then a user states one of the enrolled names and is connected to the phone number associated with the enrolled name. Here, the issue of abusing the system is not controllable since the employee may change the phone number of any enrolled name and then call that name. But, in general, since the list of enrolled names is only accessible to that user, the operator of the intelligent peripheral is keenly aware of the costs associated with such users. Biometric speaker identification may be used here in addition to standard PIN (personal identification number) codes, as will be explained, to guarantee that indeed it is the user that is making the call.

Corporate voice dialers which have a pre-enrolled list of all company contacts (employees, etc.), and internal and external users, use this service to transfer to a contact. This service is particularly susceptible to abuse since the callers of the system are, in general, not identified since the set of callers may be the entire population. The user is allowed to change only his own record, i.e., a follow-me number, to facilitate access for callers of the system.

Figure 2:
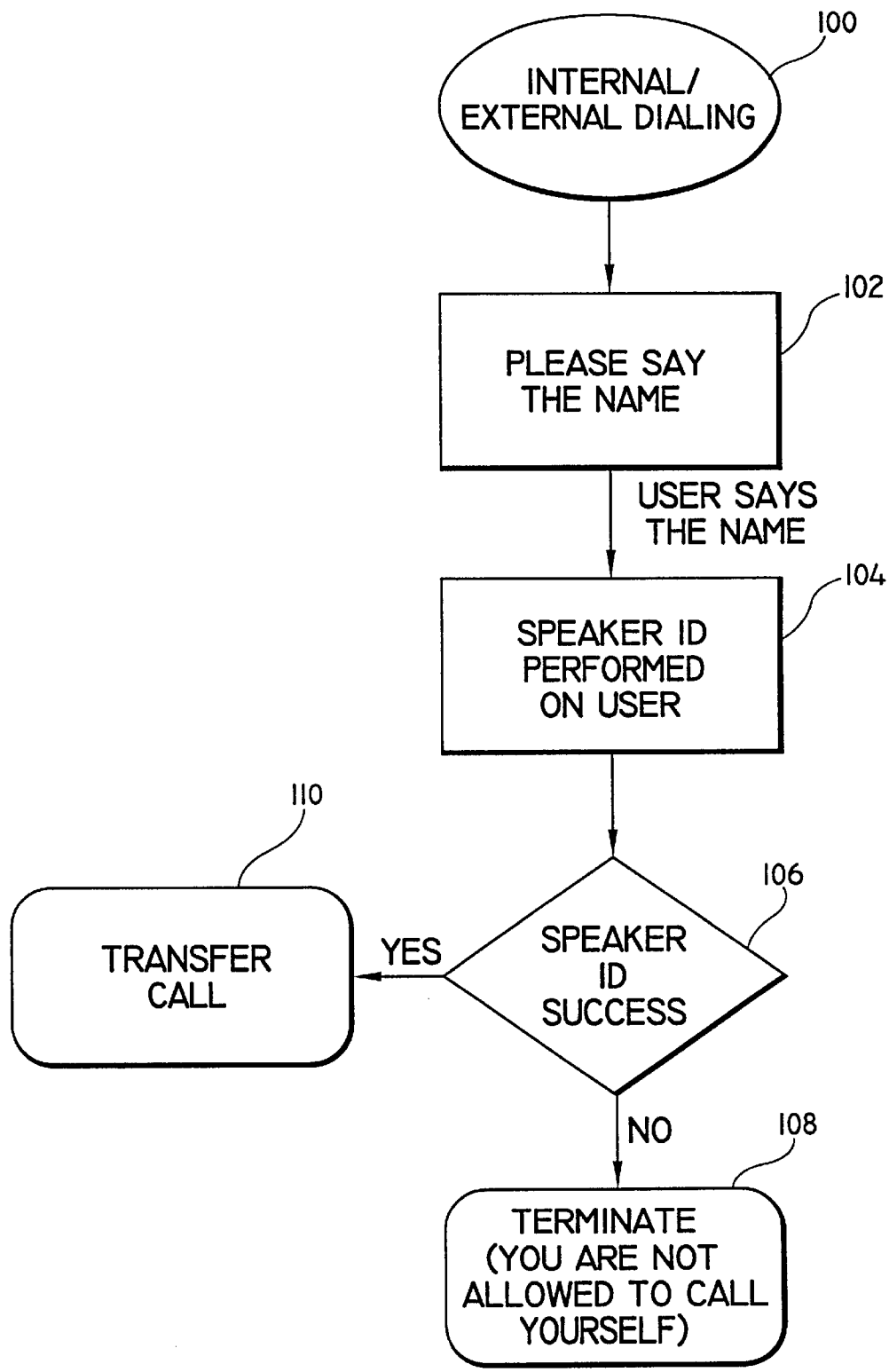
FIG. 2 is a flow chart of the call flow interaction between the voice dialing system and a user according to the present invention.

The voice dialing system 10 of the present invention, as exemplified in FIG. 1, prevents such abuse from occurring. The call forwarding abuse-prevention operation of the voice dialing system 10 will be explained in conjunction with the call flow diagram shown in FIG. 2. It is to be assumed that for the sake of the following explanation of the preferred operation that internal phone 26 is the dishonest employees corporate phone and external phone 30 is the phone of the party the employee seeks to fraudulently reach at the remote location.

The database 12 contains all the telephone numbers of the corporate employees who have the ability to use the call forwarding service. Also pre-stored in the database 12 are acoustic models which are respectively representative of speech associated with each of the subject employees. Each telephone number is associated with an acoustic model of the individual having that phone number or to an acoustic model representing a class of individuals who share similar acoustic characteristics. It is to be understood that the biometric identification module 14 which is preferably a speech/speaker recognition system generates the acoustic speech models. The module 14 may employ text-dependent or speaker-dependent identification technology as disclosed in the text: Chin-Hui Lee et al., "Automatic Speech and Speaker Recognition", Kluwer Academic Publisher, 1996. In such a case, enrollment (e.g., training data) is obtained when the user is asked to enter his name, for instance, when the voice dialing system prompts him for his name when using a voice mail feature. On the other hand, the module 14 may employ text-independent or speaker-independent identification technology as disclosed in U.S. Ser. No. 08/788, 471 (docket no. YO996-188) filed on Jan. 28, 1997, entitled: "Text-independent Speaker Recognition for Command Disambiguity and Continuous Access Control". In this case, enrollment data is derived from previous usage of the system by the user.

It is to be understood that the speaker identification module 14 and the database 12 may be implemented in hardware, software or a combination thereof. Preferably, the module 14 and database 12 are implemented in software executed on an appropriately programmed general purpose digital computer. It is to be further understood that the other functional features associated with the voice dialing system of the invention may be implemented by module 14 and database 12 or by separate modules and databases on the same appropriately programmed computer.

Accordingly, the system operates as follows. The dishonest employee forwards his telephone number, associated with his internal phone 26, to the outside partys' external phone 30 in a manner that is known in standard voice dialing systems. Next, the employee dials his own phone number from, for instance, internal phone 28 (step 100 of FIG. 2). The employee states his name at the request of the system (step 102 of FIG. 2).

The speaker identification module 14 receives the speech sample, provided by the employee stating his name, via the PBX 20, the intelligent peripheral 18 and the network 16. The intelligent peripheral 18 is preferably a device identified as a DirectTalk 6000 manufactured by IBM Corp. Further, the network 16 is preferably a local area network (LAN) and, preferably, a token-ring LAN. The speaker identification module 14 decodes the speech sample, in a known manner, and then compares the decoded speech sample with the acoustic model pre-stored in database 12 which corresponds to the telephone number dialed in step 100 (step 104 of FIG. 2). If the decoded speech sample is substantially close the acoustic model (using comparison methods known to one of ordinary skill in the art of speech/speaker recognition), then it is determined that the speaker is the employee who is associated with the number dialed (step 106 of FIG. 2). Since, the likely reason for the employee to be dialing his own number from another internal phone is to fraudulently reach the outside party at phone 30, the voice dialing system terminates the call (step 108 of FIG. 2) or provides the employee with a phone number to dial to receive a directory assistance function. Thus, the dishonest employee is prevented from attempting to defraud the company for the cost of his personal calls.

In the event that a legitimate reason may arise that would necessitate an employee dialing his own extension (e.g., checking his voice mail), the preferred system may include an operator 34 (FIG. 1) to whom the employee would be transferred to if a match occurred in step 104 or the system may provide the employee with a phone number to dial to receive a directory assistance function. The operator 34 would then permit or deny the employee to continue the call. Of course on the other hand, if there is no substantial match between the decoded speech sample and the acoustic model, then the call is put through to the outside party (step 110 of FIG. 2).

It is to be understood that the present invention is not limited to speaker identification technology. Any type of biometric measure may be used to perform the identification. For example, such biometric attributes as fingerprints (obtained with a flat bed scanner), face recognition, iris recognition, signature recognition, hand geometry, face temperature infrared pattern or any combination thereof may be used. It is to be appreciated that the above list is not intended to be exhaustive, rather, other types of biometric attributes may be employed. For that matter, it is to be understood that non-biometric attributes may be employed in addition to or in place of biometric attributes. For instance, conventional non-biometric attributes such as passwords, PINs, smartcards, digital signatures, etc., may be used. It is to be appreciated that when non-biometric attributes are used, the biometric identification module 14 is not used, in that, the comparison of the non-biometric attribute (e.g., PIN) to the associated telephone number may be done by the intelligent peripheral 18 in cooperation with the database 12.

In general, during enrollment, the necessary biometric measures are taken for all the members of a black list. In a corporate environment, this means that all employees are enrolled and different black lists are built for different services based on, for example, a predetermined service participation schedule. During use, the biometrics measured when the service is requested are compared one by one with the biometrics stored on the black list in the database. When there is no close enough match, the service is granted. When there is a close enough match, service is denied and/or the request is forwarded to the operator. Such embodiments differ slightly from the previously explained preferred embodiment with respect to the comparison step in that the former embodiment merely compares a decoded speech sample (or other biometric measure) with one acoustic (biometric) model, i.e., the model associated with the phone number dialed, while the latter embodiments use the obtained voice sample (or other biometric measure) and compare it with all models in the black list for the particular service requested.

Other applications of the present invention may, for example, include: control of jury access to outside resources, prisoner access, control of child access to TV channels or computer internet web sites. Given the teachings of the invention, one of ordinary skill in the art will appreciate various other applications not explicitly mentioned herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for preventing unauthorized use of a service in a system providing a plurality of services, the method comprising the steps of:

(a) pre-storing a biometric model for each enrolled user of the system;

(b) associating the biometric model of an enrolled user with a system service, if the enrolled user is not authorized to access the system service;

(c) obtaining biometric data from an enrolled user requesting access to a system service; and (d) performing biometric identification by comparing the obtained biometric data with each biometric model associated with the requested system service;

wherein if the obtained biometric data substantially matches one of the biometric models associated with the requested system service, the enrolled user is denied access to the requested system service.

2. The method of claim 1, wherein the biometric data is speech and wherein the biometric identification is speaker identification.

3. The method of claim 2, wherein the speaker identification is text-independent speaker identification.

4. The method of claim 1, wherein the plurality of services are associated with a voice dialing system.

5. The method of claim 1, wherein the pre-storing step is performed by a database.

6. An apparatus for preventing unauthorized use of a service in a system providing a plurality of services, the apparatus comprising:

a database for storing a biometric model for each enrolled user of the system and for storing a black list associated with at least one of the system services, the black list comprising the biometric model of each enrolled user that is not authorized to access the at least one system service;

a biometric extractor for obtaining biometric data from an enrolled user requesting a system service; and a biometric identification system for comparing the biometric data with each biometric model in the black list associated with the requested system service, wherein if the biometric data substantially matches any one of the biometric models in the black list, the enrolled user requesting the system service is denied access to the requested system service.

7. The apparatus of claim 6, wherein the biometric identification system is a speaker identification system and the biometric models are voiceprints.

8. The apparatus of claim 7, wherein the speaker identification system is a text-independent speaker identification system.

9. The apparatus of claim 6, wherein the biometric identification system is one of a fingerprint recognition system, a face recognition system, an iris recognition system, and a signature recognition system.

10. The apparatus of claim 6, wherein the system services are associated with a voice dialing system.

11. An apparatus for preventing unauthorized use of a call forwarding service of a voice dialing system, the apparatus comprising:

a database for storing a voiceprint of an enrolled user and an internal telephone number of the enrolled user of the voice dialing system, wherein the voiceprint of the enrolled user and the internal telephone number of the enrolled user are logically associated with each other; and a speaker identification system for (i) obtaining and decoding a voice sample from a person placing a phone call to an internal telephone number of the voice dialing system and (ii) comparing the decoded voice sample with the voiceprint of the enrolled user in the database corresponding to the internal telephone number dialed by the person, wherein if the decoded voice sample substantially matches the voiceprint, the phone call is prevented from being call forwarded.

12. The apparatus of claim 11, wherein the speaker identification system is a text-independent speaker identification system.

13. The apparatus of claim 11, wherein the voice print of the enrolled user comprises an acoustic model representing a class of individuals having similar voice characteristics.

* * * * *